J. E. NEW.
Sprinkler.
No. 203,487. Patented May 7, 1878.
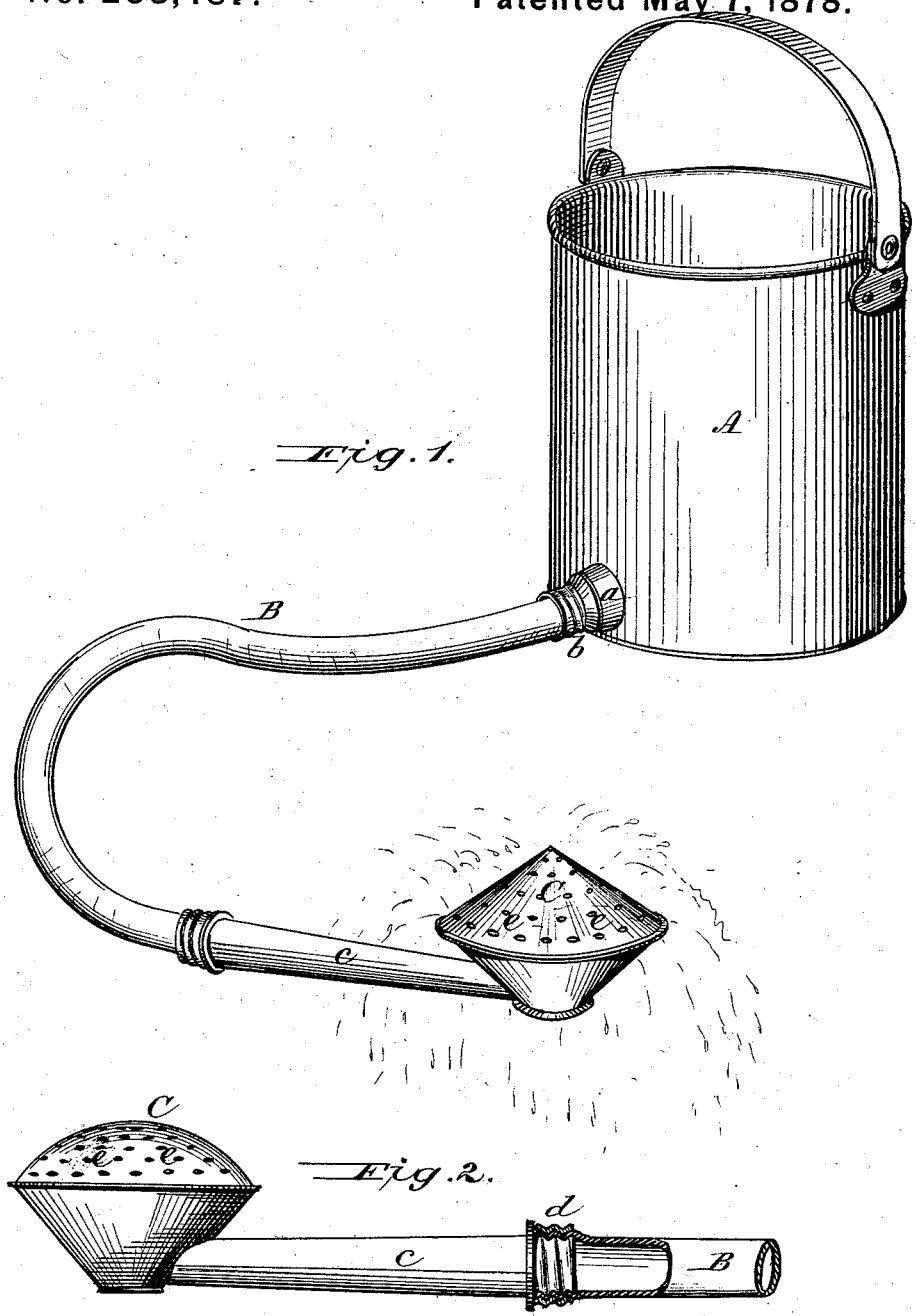

UNITED STATES PATENT OFFICE.

JAMES E. NEW, OF BINGHAMTON, NEW YORK.

IMPROVEMENT IN SPRINKLERS.

Specification forming part of Letters Patent No. 203,487, dated May 7, 1878; application filed April 26, 1878.

*To all whom it may concern:*

Be it known that I, JAMES E. NEW, of Binghamton, in the county of Broome and State of New York, have invented certain new and useful Improvements in Sprinklers; and I do hereby declare that the following is a full, clear, and exact description thereof, which will enable others skilled in the art to which it appertains to make and use the same, reference being had to the accompanying drawings, and to letters of reference marked thereon, which form a part of this specification.

I have produced a new article of manufacture, being a sprinkler consisting of a reservoir for the water, and a spray-nozzle of peculiar construction, connected thereto by a flexible tube, the construction of the spraying nozzle being a hollow-passage pipe acting also as a manipulating-handle, and a double-shell cone, or two cones meeting at their bases, the upper of which has peripheral spray-holes, by which the water is thrown upward and obliquely by manipulating said spray-tube, in a line at right angles to the perpendicular of the reservoir. In other words, the water is not ejected as in the ordinary watering-pot; but the spray is filled from the pot or reservoir by the water seeking its level, and the spray-tube is seized and manipulated in a horizontal position, with the peripherally-perforated cone up, and thus the spray falls upon every part of the floor, garden, or other surface.

In the ordinary watering-pot, with its fixed spout, the operator sways to and fro the whole pot, and throws the spray in continuous lines, with dry spaces intervening; but in my reservoir-sprayer, the operator bears the pot or reservoir in his hand or on his arm, and seizes the tube, and manipulates it rapidly over the surface to be sprinkled, covering it uniformly.

The drawings represent a perspective of the device, and a detail of the pipe-coupling.

In these drawings, the reservoir A is a pot or pail for holding water, at the side of which, very near the bottom, is an opening, having a projecting screw-collar, $a$, the threads being female, to receive the material of the flexible tube B, which is bound thereon by a corresponding screw-band ring, $b$, to insure a tight joint; but any suitable coupling may be used.

This flexible tube B is of sufficient length for convenience in using, and is preferably of the ordinary flexible rubber tubing.

The outer end of this tube B is connected with the hollow handle $c$ by a coupling, $d$, similar to the coupling $a\ b$, heretofore described. This hollow handle $c$ serves not only as a fixed connection for the flexible tube with the spray or rose C, but as a manipulating-handle, and is a continuation of the water-passage.

The rose C consists of a double-shell cone, as before described, or of two segments of spheres. The conical peripheries are, however, preferable, by reason of the convenience of manufacturing. The upper cone is perforated by spray-holes $e$, through which the water inducted from the flexible tube is discharged upwardly and obliquely, and falls in evenly-distributing sprays as the rose is manipulated horizontally, with its perforations up, not down, nor in a right line, as ordinarily.

The construction and manner of using being now thoroughly understood, it may be said that this sprinkler performs its functions in a perfect manner, evenly and effectively distributing the water upon the surface with the least quantity of water, and thus avoiding undesirable humidity of the air, and leaving the floor ready to be swept at once. It thus becomes especially valuable in sprinkling floors, gardens, and also for sprinkling clothes and tobacco.

The discharge of the water is not actuated with any momentum, but falls gently of its own weight.

Two conical pyramidal or concavously-shaped vessels, united at their bases, form the rose, with the tube entering at the side, at right angles with its axis, so that the water in passing out is in a measure arrested by the opposite inside surface of the rose, and is diverted from a right line to that of a right-angle with its passage through the tube.

By using a less flexible and heavier rubber tube, the manipulating-handle may be dispensed with, the stouter rubber tube being sufficient to operate with.

I make no claim to the combination of a water-reservoir, a flexible tube, and a spraying-nozzle; nor do I make any claim to a spraying-nozzle having the capacity to eject the water vertically or in any direction, as these things are shown to be old.

I claim—

The herein-described article of manufacture, the sprinkler, consisting of the reservoir, and the flexible tube connecting it with a spraying-nozzle formed of a double-shell cone, having spray-holes in its upper periphery, and adapted to be used as described.

In testimony that I claim the foregoing I have affixed my signature in the presence of two witnesses.

JAS. E. NEW.

Witnesses:
A. E. H. JOHNSON,
J. W. HAMILTON JOHNSON.